No. 656,452. Patented Aug. 21, 1900.
J. W. FOWLER.
MEANS FOR SECURING SHIPS' SCREW PROPELLERS UPON THEIR SHAFTS.
(Application filed Dec. 26, 1899.)
(No Model.)
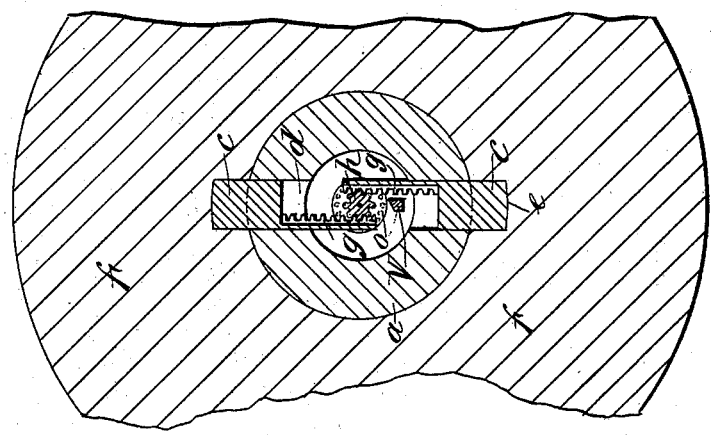
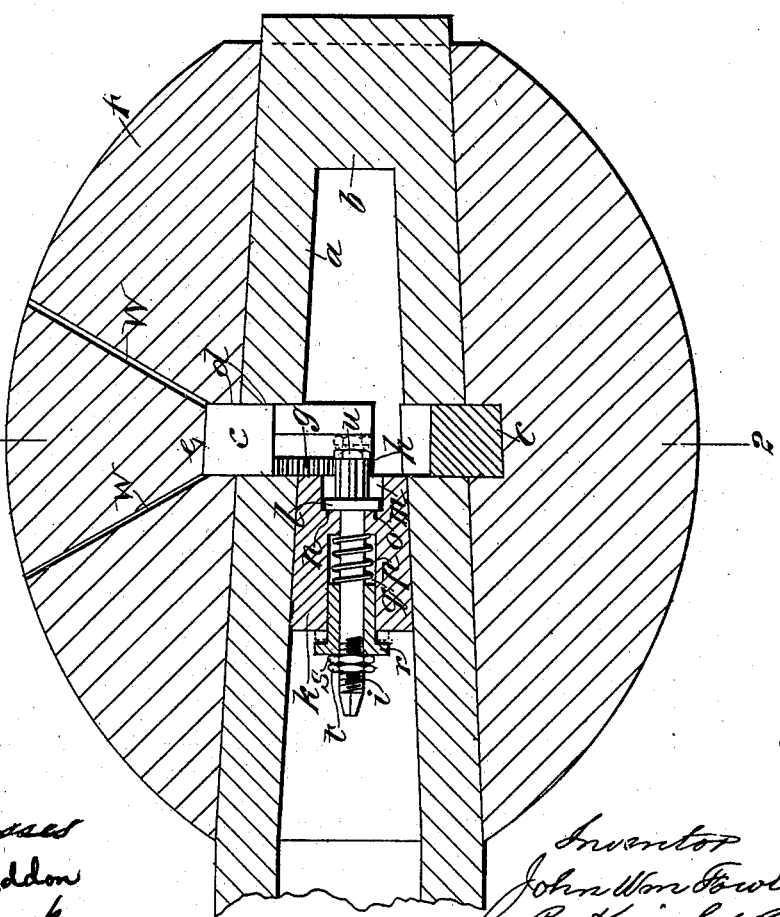

UNITED STATES PATENT OFFICE.

JOHN WILLIAM FOWLER, OF AUCKLAND, NEW ZEALAND.

MEANS FOR SECURING SHIPS' SCREW-PROPELLERS UPON THEIR SHAFTS.

SPECIFICATION forming part of Letters Patent No. 656,452, dated August 21, 1900.

Application filed December 26, 1899. Serial No. 741,648. (No model.)

*To all whom it may concern:*

Be it known that I, JOHN WILLIAM FOWLER, a subject of the Queen of Great Britain, residing at 103 Queen street, Auckland, New Zealand, have invented Improved Means for Securing a Ship's Screw-Propeller Upon Its Shaft, of which the following is a specification.

This invention provides improved means for securing a ship's screw-propeller upon its shaft, and according thereto the tail end of the propeller-shaft is made hollow, and keys at right angles to the shaft and sliding in slots formed therein are operable to project beyond the shaft into holes formed for their reception in the boss of the propeller. The keys are provided with rack-teeth formed upon them engaged by a pinion upon a spindle within the propeller-shaft, said spindle being turnable by a box-spanner, whereby the keys are projected from or drawn into the shaft, as may be desired.

I will further describe my invention by the aid of the accompanying drawings, wherein—

Figure 1 is a longitudinal central section; and Fig. 2, a section on 2 2, Fig. 1.

The propeller-shaft $a$ is hollow, the end $b$ being closed. Keys $c$, fitting within a slot $d$ cut through the shaft at right angles to its axis, are arranged to project from the shaft in opposite directions into recesses $e$, formed for their reception in the boss $f$ of the propeller. The keys have tailpieces $g$, upon which are formed rack-teeth, and a pinion $h$ gears with the teeth upon both keys and operates them simultaneously. Pinion $h$ is fixed upon a spindle $i$, passing through a bush $k$, and a collar $l$ upon the spindle fits within a recess $m$ in the bush and has a projecting pin $n$, which fits into any one of a plurality of holes $o$ formed in the bush at the back of the recess $m$. A spring $p$, surrounding the spindle, fits within a recess $q$ in bush $k$ and bearing against the back of the recess at one end and against a sleeve $r$ upon the spindle at the other tends to slide the spindle laterally and to bring pin $n$ on collar $l$ into one of the holes $o$. An adjusting-nut $s$ and lock-nut $t$ permit adjustment of the degree of compression of spring $p$, and a collar $u$ upon the end of spindle $i$ limits the movement of said spindle in one direction. A feather $v$, projecting from the face of bush $k$, as shown in Fig. 2, engages between the tailpieces $g$ of the keys $c$ and makes it impossible for the bush to revolve within the hollow shaft. Holes $w$ through the boss of the propeller permit escape of water from the recesses $e$, so that the keys may pass into them. These holes may be filled with tallow or some similar material which will squeeze out as the keys are projected.

In operation when it is desired to remove the propeller the shaft-coupling is unscrewed to permit a box-spanner to be passed into the hollow end of the shaft to engage upon the sided end of the spindle $i$. Spindle $i$ is then pushed outwardly to disengage pin $n$ from the bush $k$, when the spindle may be revolved and the bolts operated.

Having now particularly described and ascertained the nature of my said invention and in what manner the same is to be performed, I declare that what I claim is—

1. The combination of a hollow propeller-shaft having a radial slot, a propeller-boss fitting on said shaft and having recesses to register with the slot, a key sliding radially in the slot having an inwardly-projecting tailpiece provided with rack-teeth, and a spindle within the hollow shaft having a pinion engaging with the teeth, whereby the key may be projected into the recess in the boss to lock the same on the shaft, or may be withdrawn therefrom.

2. The combination of the hollow propeller-shaft $a$ having radial slots $d$, keys $c$ slidable radially in said slots, propeller-boss $f$ having recesses $e$ registering with said slots $d$, rack-formed tailpieces $g$ on the keys, pinion $h$ on spindle $i$ gearing with said racks, a bush $k$ in which the spindle has its bearings and is capable of sliding longitudinally, a locking-collar $l$ having a projecting pin engaging with holes in the sleeve, and a spring $p$ pressing the spindle endwise in locking engagement with the sleeve, substantially as described.

3. The combination of the radially-slotted hollow shaft $a$, recessed boss $f$ fitting thereon, radially-slidable keys $c$ having inwardly-projecting racks $g$, rotatable and longitudinally slidable spindle $i$ having pinion $h$ meshing with said racks; means for locking the spindle against rotation when pressed longitudinally in one direction, a spring $p$ pressing the spindle endwise into locked position, and a sleeve $r$ and nut $s$ on the spindle to receive and regulate the spring-pressure as explained.

Signed at Auckland, in the provincial district of Auckland, in the Colony of New Zealand, this 1st day of September, 1899.

JOHN WILLIAM FOWLER.

Witnesses:
G. M. NEWTON,
E. W. ALISON, Jr.